US012087223B2

(12) United States Patent
Yuan et al.

(10) Patent No.: US 12,087,223 B2
(45) Date of Patent: Sep. 10, 2024

(54) PIXEL CIRCUIT AND DISPLAY PANEL

(71) Applicant: Wuhan China Star Optoelectronics Technology Co., Ltd., Hubei (CN)

(72) Inventors: Xuebin Yuan, Hubei (CN); Chao Tian, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/772,186

(22) PCT Filed: Apr. 15, 2022

(86) PCT No.: PCT/CN2022/087128
§ 371 (c)(1),
(2) Date: Apr. 27, 2022

(87) PCT Pub. No.: WO2023/184603
PCT Pub. Date: Oct. 5, 2023

(65) Prior Publication Data

US 2024/0144872 A1 May 2, 2024

(30) Foreign Application Priority Data

Mar. 28, 2022 (CN) ........................ 202210310914.2

(51) Int. Cl.
*G09G 3/3233* (2016.01)
*G09G 3/32* (2016.01)

(52) U.S. Cl.
CPC ............ *G09G 3/3233* (2013.01); *G09G 3/32* (2013.01); *G09G 2300/0842* (2013.01);
(Continued)

(58) Field of Classification Search
None
See application file for complete search history.

(56) References Cited

U.S. PATENT DOCUMENTS 8,120,553 B2 * 2/2012 Kim .................... G09G 3/3233 315/169.3
8,878,756 B2 * 11/2014 Yamanaka ........... G09G 3/3233 345/82

(Continued)

FOREIGN PATENT DOCUMENTS

CN 104599634 5/2015
CN 205080892 3/2016

(Continued)

OTHER PUBLICATIONS

International Search Report and the Written Opinion Dated Nov. 30, 2022 From the International Searching Authority Re. Application No. PCT/CN2022/087128 and Its Translation Into English. (19 Pages).

(Continued)

*Primary Examiner* — Dorothy Harris

(57) ABSTRACT

The present disclosure discloses a pixel circuit and a display panel. The pixel circuit includes a light emitting module and a driving module including at least two driving units connected in parallel. a quantity of displayable gray scales can be improved or increased by configuring at least two driving units connected in parallel in the driving module where the at least two driving units can each correspondingly configure a light emitting current so that a plurality of light emitting brightness of the light emitting module can be implemented by a sum of these light emitting currents.

20 Claims, 2 Drawing Sheets

(52) U.S. Cl.
CPC . *G09G 2310/0262* (2013.01); *G09G 2310/08* (2013.01); *G09G 2330/021* (2013.01)

(56) References Cited

U.S. PATENT DOCUMENTS

| | | | | |
|---|---|---|---|---|
| 2004/0012545 | A1* | 1/2004 | Li | G09G 3/3233 345/55 |
| 2004/0041763 | A1 | 3/2004 | Kodama et al. | |
| 2005/0174311 | A1* | 8/2005 | Huh | G09G 3/3233 345/87 |
| 2006/0071879 | A1* | 4/2006 | Giraldo | G09G 3/3233 345/82 |
| 2006/0097965 | A1* | 5/2006 | Deane | G09G 3/3233 345/76 |
| 2006/0145968 | A1* | 7/2006 | You | G09G 3/3233 345/76 |
| 2007/0164938 | A1* | 7/2007 | Shin | G09G 3/3233 345/76 |
| 2008/0136750 | A1* | 6/2008 | Benzarti | G09G 3/3233 345/76 |
| 2009/0096725 | A1* | 4/2009 | Kretz | G09G 3/3233 345/82 |
| 2010/0091005 | A1* | 4/2010 | Kawabe | G09G 3/20 345/76 |
| 2015/0008405 | A1* | 1/2015 | Kim | G09G 3/3233 257/40 |
| 2018/0337288 | A1 | 11/2018 | Shin | |
| 2020/0221554 | A1* | 7/2020 | Chiang | H05B 45/44 |

FOREIGN PATENT DOCUMENTS

| | | |
|---|---|---|
| CN | 107680530 | 2/2018 |
| CN | 110021265 | 7/2019 |
| CN | 110473494 | 11/2019 |
| CN | 111429834 | 7/2020 |
| CN | 111653238 | 9/2020 |
| CN | 112785961 | 5/2021 |
| CN | 113012638 | 6/2021 |
| CN | 113674702 | 11/2021 |
| CN | 113707079 | 11/2021 |
| KR | 10-2021-0057629 | 5/2021 |

OTHER PUBLICATIONS

Notification of Office Action and Search Report Dated Dec. 28, 2022 From the State Intellectual Property Office of the People's Republic of China Re. Application No. 202210310914.2 and Its Translation Into English. (13 Pages).

* cited by examiner

PIXEL CIRCUIT AND DISPLAY PANEL

RELATED APPLICATIONS

This application is a National Phase of PCT Patent Application No. PCT/CN2022/087128 having International filing date of Apr. 15, 2022, which claims the benefit of priority of Chinese Patent Application No. 202210310914.2 filed on Mar. 28, 2022. The contents of the above applications are all incorporated by reference as if fully set forth herein in their entirety.

FIELD AND BACKGROUND OF THE INVENTION

The present disclosure relates to a display technology field, and more particularly to a pixel circuit and a display panel.

With the rapid development of technology in today's society, electronic products such as mobile phones, computers and TVs are widely used in all aspects of life. An electronic display screen such as a liquid crystal display panel and an OLED (Organic Light Emitting Diode) display panel is widely used, and the liquid crystal display panel using Mini-LED backlight, the OLED display panel, and an Mini-LED/Micro-LED direct display panel all use a current-driven pixel circuit.

With an increased requirement of a consumer for a display effect, kinds of colors that need to be displayed also increase, which will need to correspondingly increase a quantity of display gray scales.

The present disclosure provides a pixel circuit and a display panel, so as to alleviate a technical problem of a relatively small quantity of displayable gray scales.

In a first aspect, the present disclosure provides a pixel circuit, including a light emitting module and a driving module, wherein the light emitting module is connected in series between a positive power supply signal and a negative power supply signal; the driving module is connected in series with the light emitting module and includes at least two driving units connected in parallel; and each of the driving units is connected with a corresponding data signal and controls a light emitting time of the light emitting module based on a time interval between a pulse start time of a first control signal and a pulse start time of a second control signal.

In some implementations, each of the driving units is configured to write a data signal based on the first control signal and determine a start point of the light emitting time based on the pulse start time of the first control signal; or each of the driving units is configured to determine an end point of the light emitting time based on the pulse start time of the second control signal.

In some implementations, the at least two driving units include a first driving unit and a second driving unit. The first driving unit includes a first driving transistor and is configured to write a first data signal based on the first control signal. The second driving unit includes a second driving transistor and is configured to write a second data signal based on the first control signal. A pulse amplitude of the first data signal is different from that of the second data signal, and a size of the first driving transistor is different from that of the second driving transistor.

In some implementation, a range of a ratio of a size of one of the first driving transistor and the second driving transistor to a size of another of the first driving transistor and the second driving transistor is greater than or equal to 1.8 and less than or equal to 2.2.

In some implementation, a range of a ratio of a size of one of the first driving transistor and the second driving transistor to a size of another of the first driving transistor and the second driving transistor is greater than or equal to 2.7 and less than or equal to 3.3.

In some implementation, a range of a ratio of a size of one of the first driving transistor and the second driving transistor to a size of another of the first driving transistor and the second driving transistor is greater than or equal to 3.6 and less than or equal to 4.4.

In some implementations, the at least two driving units include a first driving unit, a second driving unit, and a third driving unit. The first driving unit includes a first driving transistor and is configured to write a first data signal based on the first control signal. The second driving unit includes a second driving transistor and is configured to write a second data signal based on the first control signal. The third driving unit includes a third driving transistor and is configured to write a third data signal based on the first control signal. A pulse amplitude of the first data signal, a pulse amplitude of the second data signal, and a pulse amplitude of the third data signal are different, and a size of the first driving transistor, a size of the second driving transistor, and a size of the third driving transistor are different.

In some implementation, a range of a ratio of a size of the first driving transistor to a size of the second driving transistor is greater than or equal to 1.8 and less than or equal to 2.2. A range of a ratio of a size of the second driving transistor to a size of the third driving transistor is greater than or equal to 1.8 and less than or equal to 2.2.

In some implementation, each of the driving units includes a driving transistor, a charging transistor, a discharging transistor, and a storage capacitor. One of a source/drain of the driving transistor is electrically connected to one terminal of the light emitting module, and another of the source/drain of the driving transistor is connected with the negative power supply signal. Alternatively, one of the source/drain of the driving transistor is connected with the positive power supply signal, and another of the source/drain of the driving transistor is electrically connected to another terminal of the light emitting module. One of a source/drain of the charging transistor is electrically connected to a gate of the driving transistor, another of the source/drain of the charging transistor is connected with the corresponding data signal, and a gate of the charging transistor is connected with the first control signal. One of a source/drain of the discharging transistor is electrically connected to the gate of the driving transistor, another of the source/drain of the discharging transistor is connected with an initial signal, and a gate of the discharging transistor is connected with the second control signal. One terminal of the storage capacitor is electrically connected to the gate of the driving transistor, and another terminal of the storage capacitor is electrically connected to another of the source/drain of the driving transistor.

In some implementations, the light emitting module includes at least two light emitting devices connected in series, and the at least two light emitting devices are connected in series between the positive power supply signal and the negative power supply signal.

In a second aspect, the present disclosure provides a display panel including the pixel circuit in at least one of embodiments, and the display panel is a self light emitting display panel.

The pixel circuit and the display panel provided in the present disclosure can improve or increase the quantity of displayable gray scales by configuring at least two driving units connected in parallel in the driving module where the at least two driving units can each correspondingly configure a light emitting current so that a plurality of light emitting brightness of the light emitting module can be achieved by a sum of these light emitting currents. In addition, the light emitting brightness of the light emitting module can also be adjusted by adjusting the interval time to further change the light emitting time, and the quantity of displayable gray scales can be further improved or increased in combination with the light emitting current configured by each of the at least two driving units.

Further, the pixel circuit and the display panel provided in the present disclosure can also increase a control voltage corresponding to the light emitting current by shortening the light emitting time and increasing the pulse amplitude of the data signal, so as to improve or avoid a case in which the driving module controls the light emitting current inaccurately or even out of control under a low gray scale and a relatively low control voltage.

Further, the pixel circuit and the display panel provided in the present disclosure can decrease the frequency of the first control signal and/or the second control signal by adjusting the time interval between the pulse start time of the first control signal, and the pulse start time of the second control signal to control the light emitting time of the light emitting module, compared with the conventional technical solution in which the light emitting time is controlled with one pulse signal. As a result, a frequency of a potential change of the first control signal and/or the second control signal can be reduced, which can not only decrease power consumption, but also reduce design difficulty, loading amount, and cost of a circuit or a chip of generating the first control signal and/or the second control signal.

DESCRIPTION OF SPECIFIC EMBODIMENTS OF THE INVENTION

To make the objectives, technical solutions, and effects of the present disclosure more clear and definite, the present disclosure is illustrated in detail below by referring to the accompanying drawings and illustrating the embodiments. It should be understood that the specific implementations described here are only used to explain the present disclosure, and are not used to limit the present disclosure.

Figure 1:
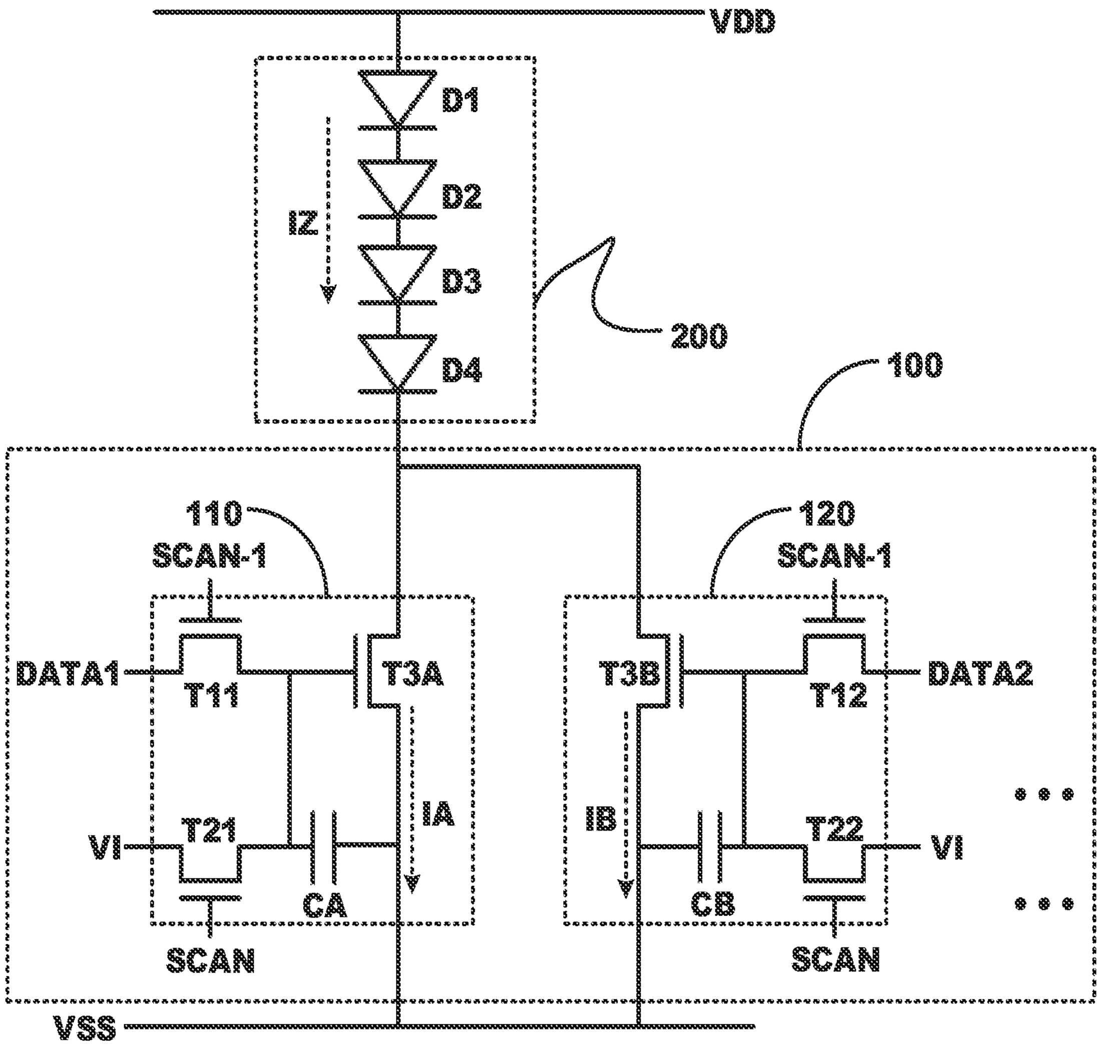
FIG. 1 is a schematic structural view of a pixel circuit according to an embodiment of the present disclosure.
Figure 2:
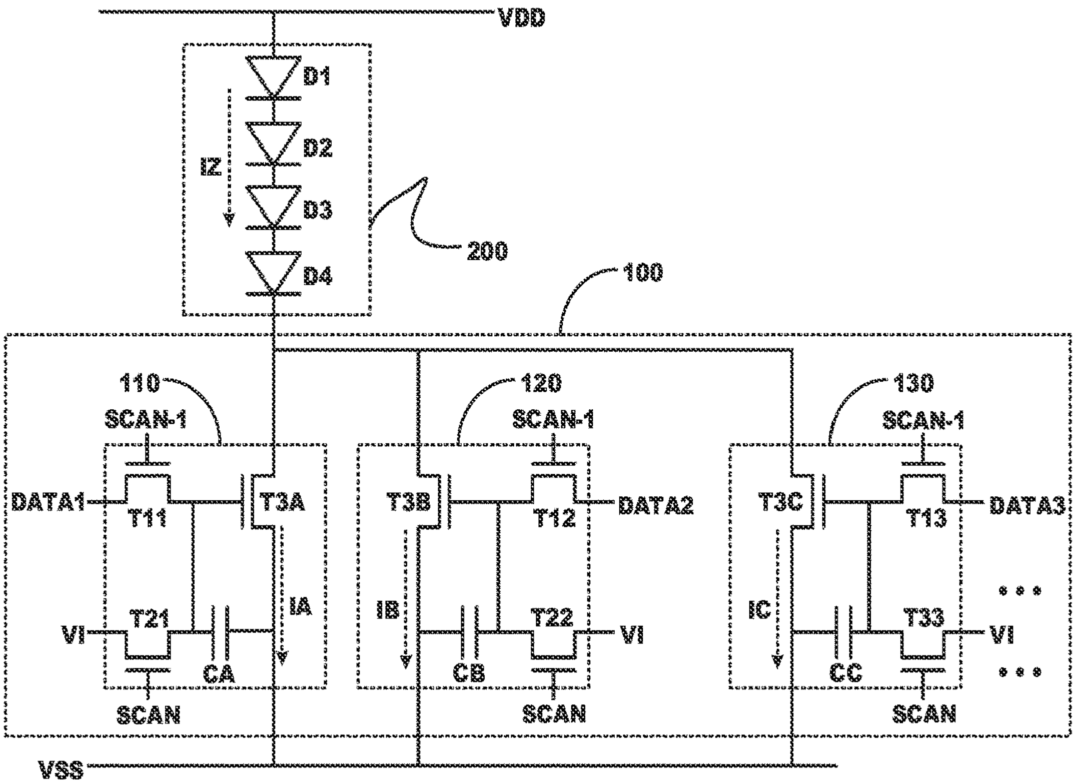
FIG. 2 is another schematic structural view of a pixel circuit according to an embodiment of the present disclosure.
Figure 3:
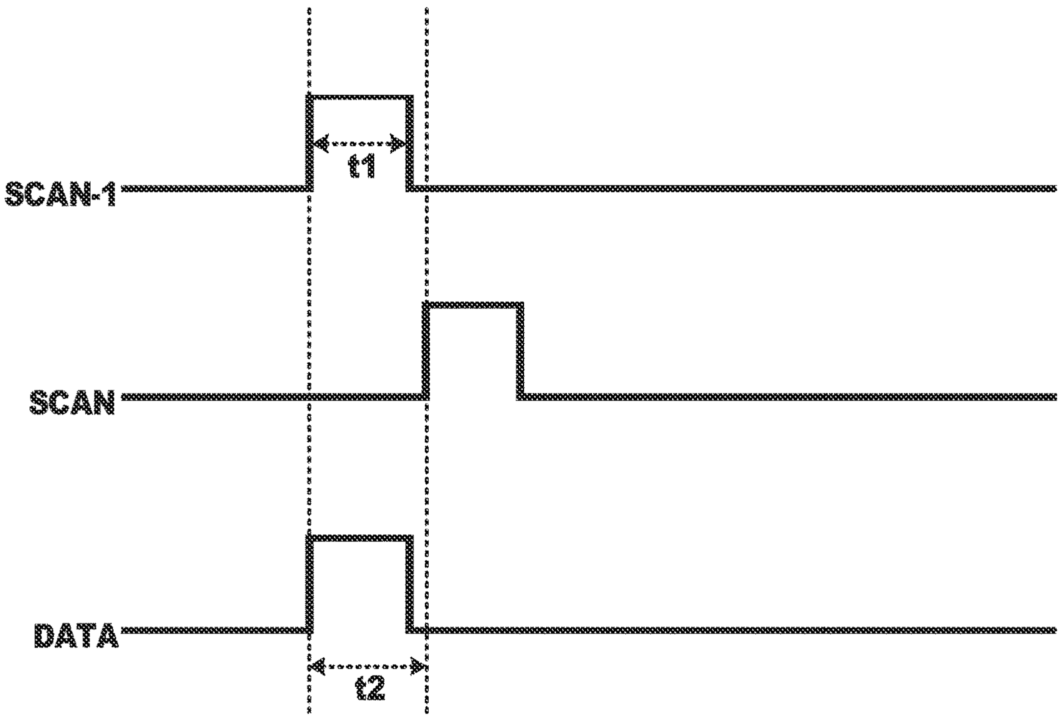
FIG. 3 is a schematic timing diagram of the pixel circuit shown in FIG. 1 or FIG. 2.

In view of the foregoing mentioned technical problem of the relatively small quantity of displayable gray scales, this embodiment provides a pixel circuit. Referring to FIG. 1 to FIG. 3, as shown in FIG. 1 or FIG. 2, the pixel circuit includes a light emitting module 200 and a driving module 100, where the light emitting module 200 is connected in series between a positive power supply signal VDD and a negative power supply signal VSS. The driving module 100 is connected in series with the light emitting module 200 and includes at least two driving units connected in parallel. Each of the driving units is connected with a corresponding data signal, and controls a light emitting time of the light emitting module 200 based on a time interval between a pulse start time of a first control signal and a pulse start time of a second control signal.

It should be understood that the pixel circuit provided in this embodiment can improve or increase the quantity of displayable gray scales by configuring at least two driving units connected in parallel in the driving module 100 where the at least two driving units can each correspondingly configure a light emitting current so that a plurality of light emitting brightness of the light emitting module 200 can be implemented by a sum of these light emitting currents. In addition, the light emitting brightness of the light emitting module 200 can also be adjusted by adjusting the interval time to further change the light emitting time, in combination with the light emitting current configured by each of the at least two driving units, the quantity of displayable gray scales can be further improved or increased.

Further, the pixel circuit provided in this embodiment can also increase a control voltage corresponding to the light emitting current by shortening the light emitting time and/or increasing the pulse amplitude of the data signal, so as to improve or avoid a case in which the driving module 100 controls the light emitting current inaccurately or even out of control under a low gray scale and a relatively low control voltage.

Further, the pixel circuit provided in this embodiment can decrease the frequency of the first control signal and/or the second control signal by controlling the light emitting time of the light emitting module 200. The light emitting time of the light emitting module 200 can be controlled by adjusting the time interval between the pulse start time of the first control signal and the pulse start time of the second control signal, in contrast to the conventional technical solution in which the light emitting time is controlled with one pulse signal. As a result, a frequency of a potential change of the first control signal and/or the second control signal can be reduced, which can not only decrease power consumption, but also reduce design difficulty, loading amount, and cost of a circuit or a chip of generating the first control signal and/or the second control signal.

It should be noted that, in this embodiment, the data signal connected with each of the driving units can be, but not limited to, the same, and can have the same frequency and different pulse amplitudes. It should be understood that the light emitting current flowing through each of the driving units may be adjusted by connecting a data signal having a different pulse amplitude with the corresponding driving unit, so that the light emitting current flowing through the light emitting module 200 is changed, so as to achieve a corresponding display gray scale of the light emitting module 200.

In an embodiment, each of the driving units is configured to write a data signal based on the first control signal and determine a start point of the light emitting time based on the pulse start time of the first control signal. In addition, each of the driving units is configured to determine an end point of the light emitting time based on the pulse start time of the second control signal.

It should be noted that the pulse start time in the embodiments is a rising edge of a positive pulse or a falling edge of a negative pulse. Each light emitting time may be a time period which has a start time and an end time, that is, a start point and an end point.

It should be understood that the time interval in the embodiments may be a duration between a start point and an end point of the light emitting time in each frame. Further, the embodiments can control the light emitting time of the light emitting module 200 with the first control signal and the second control signal instead of the same control signal, so that frequencies of the first control signal and the second control signal can be reduced.

The first control signal may be, but not limited to, a (N−1)-th level scanning signal SCAN-1, the second control signal may be, but not limited to, an Nth level scanning signal SCAN, and the (N−1)-th level scanning signal SCAN-1 and the Nth level scanning signal SCAN may be generated by two gate driving circuits, respectively. The first control signal may also be an Nth-level scanning signal SCAN, the second control signal may also be a (N+1)-th level scanning signal, and the Nth-level scanning signal SCAN and the (N+1)-th level scanning signal may be respectively generated by two gate driving circuits, or may be generated by the same gate driving circuit.

In one of the embodiments, as shown in FIG. 1, the at least two driving units include a first driving unit 110 and a second driving unit 120. The first driving unit 110 includes a first driving transistor T3A and is configured to write a first data signal DATA1 based on the first control signal. The second driving unit 120 includes a second driving transistor T3B and is configured to write a second data signal DATA2 based on the first control signal. A pulse amplitude of the first data signal DATA1 is different from that of the second data signal DATA2, and a size of the first driving transistor T3A is different from that of the second driving transistor T3B.

It should be noted that, in this embodiment, a size of the driving transistor is directly proportional to a current flowing through the driving transistor. That is, the larger the size of the driving transistor is, the higher the current flowing through the driving transistor is, and correspondingly, the light emitting current flowing through the light emitting module 200 can be also increased.

In an embodiment, a range of a ratio of a size of one of the first driving transistor T3A and the second driving transistor T3B to a size of another of the first driving transistor T3A and the second driving transistor T3B is greater than or equal to 1.8 and less than or equal to 2.2, and may be specifically 2:1.

It should be noted that a size ratio between corresponding driving transistors is further limited in this embodiment. However, since there may be more or less errors in a size of each of the driving transistors in an actual process of manufacturing the driving transistors, the size ratio in each of the embodiments of the present disclosure may be, but not limited to, equal to a corresponding ratio, or may be approximately equal to a corresponding ratio. Being approximately equal means that a fluctuation range of about ±10% may be allowed. For example, if a ratio of a size of one of the first driving transistor T3A and the second driving transistor T3B to that of another of the first driving transistor T3A and the second driving transistor T3B is 2:1, a range of a ratio of a size of one of the first driving transistor T3A and the second driving transistor T3B to that of another of the first driving transistor T3A and the second driving transistor T3B may be greater than or equal to 1.8 and less than or equal to 2.2. It may be understood that the smaller the fluctuation range is, the closer corresponding to a ratio between actual sizes of corresponding driving transistors is.

Specifically, an allowable error range of a size of each of the driving transistors may be ±5%. For example, a size of a 100 micron driving transistor allows an error of 5 micron, and a size of a 200 micron driving transistor allows an error of 10 micron.

When a gate potential of the driving transistor is determined, the on-state current of the driving transistor is positively correlated with the size (TFT Size) of the driving transistor. Therefore, in FIG. 1, IA: IB≈T3A: T3B (there is a slight fluctuation in an actual case, and the TFT Size may be appropriately adjusted), and IZ=IA+IB. It is assumed that T3A=2T3B in terms of the size, that is, when DATA1=DATA2=Vopen (where Vopen is defined as the gate potential of the corresponding driving transistor in the on-state), IA=2IB=2Iopen, IZ=3Iopen. When DATA1=Vopen and DATA2=Vclose (Vclose is defined as the gate potential of the corresponding driving transistor in the off-state), IA=2Iopen, IB≈0, and IZ=IA+IB=2Iopen. When DATA1=Vclose and DATA2=Vopen, IA≈0, IB=Iopen, IZ=Iopen. When DATA1=DATA2=Vclose, IA=IB≈0, IZ≈0. The foregoing case can be shown in the following Table 1. It can be seen that IZ has four output states in total according to different state combinations of DATA1 and DATA2, and the four output states are theoretically linearly distributed. Each of the output states may correspond to a display gray scale, and the correspondence between the output state and the gray scale may be expressed as a binary-to-decimal conversion.

TABLE 1

| Size ratio | DATA1 | DATA2 | IA | IB | IZ |
|---|---|---|---|---|---|
| T3A:T3B = 2:1 | Vopen (1) | Vopen (1) | 2Iopen | Iopen | 3Iopen (3) |
| | Vopen (1) | Vclose (0) | 2Iopen | 0 | 2Iopen (2) |
| | Vclose (0) | Vopen (1) | 0 | Iopen | Iopen (1) |
| | Vclose (0) | Vclose (0) | 0 | 0 | 0 (0) |

In an embodiment, a range of a ratio of a size of one of the first driving transistor T3A and the second driving transistor T3B to a size of another of the first driving transistor T3A and the second driving transistor T3B is greater than or equal to 2.7 and less than or equal to 3.3, and may be specifically 3:1.

It should be understood that, in the foregoing embodiment, the potential of corresponding data signal has only two states: Vopen and Vclose. For example, a driving state of Vhalf is introduced (when the gate potential of the corresponding driving transistor is Vhalf, a current flowing through the driving transistor is equal to half of the current flowing through the driving transistor when the gate potential of the driving transistor is Vopen). On this basis, T3A:T3B=3:1 may be adjusted. After the Vhalf is introduced, each of the data signals has three states of 0, 1 and 2, and nine linear states of 0-8 can be output. The correspondence can be expressed as a ternary-to-decimal conversion. Similarly, the number of bits in ternary can be increased by increasing the number of driving units to achieve more output states.

Specifically, the nine linear states are specifically shown in the following Table 2. It may be understood that each of the linear state may correspond to one display gray scale.

TABLE 2

| Size ratio | DATA1 | DATA2 | IA | IB | IZ |
|---|---|---|---|---|---|
| T3A:T3B = 3:1 | Vopen (2) | Vopen (2) | 6Iopen | 2Iopen | 8Iopen (8) |
| | Vopen (2) | Vhalf (1) | 6Iopen | Iopen | 7Iopen (7) |
| | Vopen (2) | Vclose (0) | 6Iopen | 0 | 6Iopen (6) |

TABLE 2-continued

| Size ratio | DATA1 | DATA2 | IA | IB | IZ |
|---|---|---|---|---|---|
| | Vhalf (1) | Vopen (2) | 3Iopen | 2Iopen | 5Iopen (5) |
| | Vhalf (1) | Vhalf (1) | 3Iopen | Iopen | 4Iopen (4) |
| | Vhalf (1) | Vclose (0) | 3Iopen | 0 | 3Iopen (3) |
| | Vclose (0) | Vopen (2) | 0 | 2Iopen | 2Iopen (2) |
| | Vclose (0) | Vhalf (1) | 0 | Iopen | Iopen (1) |
| | Vclose (0) | Vclose (0) | 0 | 0 | 0 (0) |

In an embodiment, a range of a ratio of a size of one of the first driving transistor T3A and the second driving transistor T3B to a size of another of the first driving transistor T3A and the second driving transistor T3B is greater than or equal to 3.6 and less than or equal to 4.4, and may be specifically 4:1.

It may be understood that the driving voltages corresponding to the intermediate states of the data signal are further introduced, for example, Vmid1 and Vmid2 (IVclose:IVmid2:IVmid1:IVopen=0:1:2:3), where, IVclose represents a current flowing through the corresponding driving transistor when the gate potential of the driving transistor is Vclose, IVmid2 represents a current flowing through the corresponding driving transistor when the gate potential of the driving transistor is Vmid2, IVmid1 represents a current flowing through the corresponding driving transistor when the gate potential of the driving transistor is Vmid1, and IVopen represents a current flowing through the corresponding driving transistor when the gate potential of the driving transistor is Vopen. This can be converted to a quaternary-to-decimal conversion as shown in Table 3 below. Theoretically, the more the driving voltages corresponding to intermediate states of the corresponding data signal are introduced, the more the number of the output state of the light emitting current flowing through the light emitting module 200, i.e., a quantity of displayable gray scales is. However, in an actual operation, when the driving voltage of the data signal is too low to reach a threshold voltage of the corresponding driving transistor, a current discrimination effect cannot be achieved. When the driving voltage is so large to enter a saturation region, the current discrimination effect is not obvious. Therefore, the number of the driving voltages in the intermediate state is not configured too much in use. In addition, performing a direct-current voltage dimming by introducing the driving voltage in the intermediate state does not conflict with increasing the number of the driving units, which may be combined with each other to reach a larger number of light emitting currents, so as to further increase a quantity of displayable gray scales.

TABLE 3

| Size ratio | DATA1 | DATA2 | IA | IB | IZ |
|---|---|---|---|---|---|
| T3A:T3B = 4:1 | Vopen (3) | Vopen (3) | 12Iopen | 3Iopen | 15Iopen (15) |
| | Vopen (3) | Vmid1 (2) | 12Iopen | 2Iopen | 14Iopen (14) |
| | Vopen (3) | Vmid2 (1) | 12Iopen | Iopen | 13Iopen (13) |
| | Vopen (3) | Vclose (0) | 12Iopen | 0 | 12Iopen (12) |
| | Vmid1 (2) | Vopen (3) | 8Iopen | 3Iopen | 11Iopen (11) |

TABLE 3-continued

| Size ratio | DATA1 | DATA2 | IA | IB | IZ |
|---|---|---|---|---|---|
| | Vmid1 (2) | Vmid1 (2) | 8Iopen | 2Iopen | 10Iopen (10) |
| | Vmid1 (2) | Vmid2 (1) | 8Iopen | Iopen | 9Iopen (9) |
| | Vmid1 (2) | Vclose (0) | 8Iopen | 0 | 8Iopen (8) |
| | Vmid2 (1) | Vopen (3) | 4Iopen | 3Iopen | 7Iopen (7) |
| | Vmid2 (1) | Vmid1 (2) | 4Iopen | 2Iopen | 6Iopen (6) |
| | Vmid2 (1) | Vmid2 (1) | 4Iopen | Iopen | 5Iopen (5) |
| | Vmid2 (1) | Vclose (0) | 4Iopen | 0 | 4Iopen (4) |
| | Vclose (0) | Vopen (3) | 0 | 3Iopen | 3Iopen (3) |
| | Vclose (0) | Vmid1 (2) | 0 | 2Iopen | 2Iopen (2) |
| | Vclose (0) | Vmid2 (1) | 0 | Iopen | Iopen (1) |
| | Vclose (0) | Vclose (0) | 0 | 0 | 0 (0) |

In one of the embodiments, as shown in FIG. 2, the at least two driving units include a first driving unit 110, a second driving unit 120, and a third driving unit 130. The first driving unit 110 includes a first driving transistor T3A and is configured to write the first data signal DATA1 based on the first control signal. The second driving unit 120 includes a second driving transistor T3B and is configured to write the second data signal DATA2 based on the first control signal. The third driving unit 130 includes a third driving transistor T3C and is configured to write the third data signal DATA3 based on the first control signal. The pulse amplitude of the first data signal DATA1, the pulse amplitude of the second data signal DATA2, and the pulse amplitude of the third data signal DATA3 are different, and the size of the first driving transistor T3A, the size of the second driving transistor T3B, and the size of the third driving transistor T3C are different.

It should be understood that the number of driving units is further increased in this embodiment, and correspondingly, a third driving transistor T3C is also introduced, which may further enrich kinds of the light emitting currents flowing through the light emitting module 200, so that a quantity of displayable gray scales can be further improved.

In an embodiment, a ratio of a size of one of the first driving transistor T3A, the second driving transistor T3B, and the third driving transistor T3C to a size of another of the first driving transistor T3A, the second driving transistor T3B, and the third driving transistor T3C to a size of further one of the first driving transistor T3A, the second driving transistor T3B, and the third driving transistor T3C is 4:2:1.

For example, a range of a ratio of a size of the first driving transistor T3A to a size of the second driving transistor T3B is greater than or equal to 1.8 and less than or equal to 2.2. A range of a ratio of a size of the second driving transistor T3B to a size of the third driving transistor T3C is greater than or equal to 1.8 and less than or equal to 2.2.

It should be understood that in this embodiment, IZ has eight output states in total according to different state combinations of DATA1, DATA2 and DATA3 as shown in the following Table 4, and the eight output states are theoretically linearly distributed. Each of the output states may correspond to a display gray scale, and the correspondence between the output state and the display gray scale may be expressed as a binary-to-decimal conversion.

TABLE 4

| Size ratio | DATA1 | DATA2 | DATA3 | IA | IB | IC | IZ |
|---|---|---|---|---|---|---|---|
| T3A:T3B:T3C = 4:2:1 | Vopen (1) | Vopen (1) | Vopen (1) | 4Iopen | 2Iopen | Iopen | 7Iopen (7) |
| | Vopen (1) | Vopen (1) | Vclose (0) | 4Iopen | 2Iopen | 0 | 6Iopen (6) |

TABLE 4-continued

| Size ratio | DATA1 | DATA2 | DATA3 | IA | IB | IC | IZ |
|---|---|---|---|---|---|---|---|
| | Vopen (1) | Vclose (0) | Vopen (1) | 4Iopen | 0 | Iopen | 5Iopen (5) |
| | Vopen (1) | Vclose (0) | Vclose (0) | 4Iopen | 0 | 0 | 4Iopen (4) |
| | Vclose (0) | Vopen (1) | Vopen (1) | 0 | 2Iopen | Iopen | 3Iopen (3) |
| | Vclose (0) | Vopen (1) | Vclose (0) | 0 | 2Iopen | 0 | 2Iopen (2) |
| | Vclose (0) | Vclose (0) | Vopen (1) | 0 | | Iopen | Iopen (1) |
| | Vclose (0) | Vclose (0) | Vclose (0) | 0 | | 0 | 0 (0) |

In an embodiment, each of the driving units includes a driving transistor, a charging transistor, a discharging transistor, and a storage capacitor. One of a source/drain of the driving transistor is electrically connected to one terminal of the light emitting module 200, and another of the source/drain of the driving transistor is connected with the negative power supply signal VSS. Alternatively, one of the source/drain of the driving transistor is connected with the positive power supply signal VDD, and another of the source/drain of the driving transistor is electrically connected to the another terminal of the light emitting module 200. One of a source/drain of the charging transistor is electrically connected to a gate of the driving transistor, another of the source/drain of the charging transistor is connected with a corresponding data signal, and a gate of the charging transistor is connected to the first control signal. One of a source/drain of the discharging transistor is electrically connected to the gate of the driving transistor, another of the source/drain of the discharging transistor is connected with an initial signal VI, and a gate of the discharging transistor is connected with the second control signal. One terminal of the storage capacitor is electrically connected to the gate of the driving transistor, and another terminal of the storage capacitor is electrically connected to another of the source/drain of the driving transistor.

For example, as shown in FIG. 1 or FIG. 2, the first driving unit 110 may include a first driving transistor T3A, a first charging transistor T11, a first discharging transistor T21, and a first storage capacitor CA. One of a source/drain of the first driving transistor T3A is electrically connected to one terminal of the light emitting module 200, and another of the source/drain of the first driving transistor T3A is connected with the negative power supply signal VSS. Alternatively, one of the source/drain of the first driving transistor T3A is connected with the positive power supply signal VDD, and another of the source/drain of the first driving transistor T3A is electrically connected to another terminal of the light emitting module 200. One of the source/drain of the first charging transistor T11 is electrically connected to the gate of the first driving transistor T3A, another of the source/drain of the first charging transistor T11 is connected with the first data signal DATA1, and the gate of the first charging transistor T11 is connected with the first control signal. One of the source/drain of the first discharging transistor T21 is electrically connected to the gate of the first driving transistor T3A, another of the source/drain of the first discharging transistor T21 is connected to the initial signal VI, and the gate of the first discharging transistor T21 is connected with the second control signal. One terminal of the first storage capacitor CA is electrically connected to the gate of the first driving transistor T3A, and another terminal of the first storage capacitor CA is electrically connected to another of the source/drain of the first driving transistor T3A.

As shown in FIG. 1 or FIG. 2, the second driving unit 120 may include a second driving transistor T3B, a second charging transistor T12, a second discharging transistor T22, and a second storage capacitor CB. One of a source/drain of the second driving transistor T3B is electrically connected to one terminal of the light emitting module 200, and another of the source/drain of the second driving transistor T3B is connected with a negative power supply signal VSS. Alternatively, one of the source/drain of the second driving transistor T3B is connected with a positive power supply signal VDD, and another of the source/drain of the first driving transistor T3B is electrically connected to another terminal of the light emitting module 200. One of a source/drain of the second charging transistor T12 is electrically connected to the gate of the second driving transistor T3B, another of the source/drain of the second charging transistor T12 is connected with the second data signal DATA2, and the gate of the second charging transistor T12 is connected with the second control signal. One of a source/drain of the second discharging transistor T22 is electrically connected to the gate of the second driving transistor T3B, another of the source/drain of the second discharging transistor T22 is connected to the initial signal VI, and the gate of the second discharging transistor T22 is connected with the second control signal. One terminal of the second storage capacitor CB is electrically connected with the gate of the second driving transistor T3B, and another terminal of the second storage capacitor CB is electrically connected to another of the source/drain of the second driving transistor T3B.

As shown in FIG. 3, the third driving unit 130 may include a third driving transistor T3C, a third charging transistor T13, a third discharging transistor T23, and a third storage capacitor CC. One of a source/drain of the third driving transistor T3C is electrically connected to one terminal of the light emitting module 200, and another of the source/drain of the third driving transistor T3C is connected with a negative power supply signal VSS. Alternatively, one of the source/drain of the third driving transistor T3C is connected with a positive power supply signal VDD, and another of the source/drain of the third driving transistor T3C is electrically connected to another terminal of the light emitting module 200. One of a source/drain of the third charging transistor T13 is electrically connected to the gate of the third driving transistor T3C, another of the source/drain of the third charging transistor T13 is connected with the third data signal DATA3, and the gate of the third charging transistor T13 is connected with the third control signal. One of a source/drain of the third discharging transistor T23 is electrically connected to the gate of the third driving transistor T3C, another of the source/drain of the third discharging transistor T23 is connected to the initial signal VI, and the gate of the third discharging transistor T23 is connected with the third control signal. One terminal of the third storage capacitor CC is electrically connected to the gate of the third driving transistor T3C, and another terminal of the third storage capacitor CC is electrically connected to another of the source/drain of the third driving transistor T3C.

In an embodiment, the light emitting module 200 includes at least two light emitting devices connected in series, for example, a first light emitting device D1, a second light emitting device D2, a third light emitting device D3, and a fourth light emitting device D4. The at least two light emitting devices are connected in series between the positive power supply signal VDD and the negative power supply signal VSS.

It should be noted that the light emitting device in this embodiment may be, but not limited to, an organic light emitting diode, or may be one of a sub-millimeter light emitting diode, a micro light emitting diode, or a quantum dot light emitting diode.

In the case of the same power, for a single light emitting device, a potential of the positive power supply signal VDD is relatively low, which causes a current flowing through a wiring that transmits the positive power supply signal VDD to be relatively high, so that a requirement of an equivalent wire diameter of the wiring is high; and for a plurality of light emitting devices connected in series, a potential of the positive power supply signal VDD may be set to be a relatively high potential, which may cause currents flowing through wirings that transmit the positive power supply signal VDD to be decreased, so that a requirement of the wirings may be decreased.

An operation process of the foregoing pixel circuit is shown in FIG. 3. In a pulse duration t1 of the (N−1)-th level scanning signal SCAN-1, a corresponding charging transistor is switched on or turned on to write the corresponding data signal DATA, and when a rising edge of the N-th level scanning signal SCAN arrives, a gate of the corresponding driving transistor is discharged to turn off or cut off the driving transistor. The time interval between the rising edge of the (N−1)-th level scanning signal SCAN-1 and the N-th level scanning signal SCAN is t2, which is the minimum subfield display time. The data signals DATA may be at least one of the first data signal DATA1, the second data signal DATA2, or the third data signal DATA3.

In one of the embodiments, the embodiment provides a display panel including the pixel circuit above described in the at least one embodiment. The display panel may be a self light emitting display panel, which may be, for example, any one of an OLED display panel, a Mini-LED display panel, a Micro-LED display panel, or a QLED display panel.

It should be understood that the display panel provided in this embodiment can improve or increase a quantity of displayable gray scales by configuring at least two driving units connected in parallel in the driving module 100 where the at least two driving units can each correspondingly configure a light emitting current so that a plurality of types of light emitting brightness of the light emitting module 200 can be achieved by a sum of these light emitting currents. the light emitting brightness of the light emitting module 200 can also be adjusted by adjusting the interval time to further change the light emitting time, and the quantity of displayable gray scales can be further improved or increased in combination with the light emitting current configured by each of the at least two driving units.

Further, the display panel provided in the embodiment can also increase a control voltage corresponding to the light emitting current by shortening the light emitting time and increasing the pulse amplitude of the data signal, so as to improve or avoid a case in which the driving module 100 controls the light emitting current inaccurately or even out of control under a low gray scale and a relatively low control voltage.

Further, the display panel provided in the embodiment can decrease the frequency of the first control signal and/or the second control signal by adjusting the time interval between the pulse start time of the first control signal, and the pulse start time of the second control signal to control the light emitting time of the light emitting module 200, compared with the conventional technical solution in which the light emitting time is controlled with one pulse signal. As a result, a frequency of a potential change of the first control signal and/or the second control signal can be reduced, which can not only decrease power consumption, but also reduce design difficulty, loading amount, and cost of a circuit or a chip of generating the first control signal and/or the second control signal.

It can be understood that, for those ordinary skilled in the art, equivalent replacements or changes can be made according to the technical solutions and inventive concepts of the present disclosure, and all such changes or replacements should fall within the protection scope of the claims appended to the present disclosure.

What is claimed is:

1. A pixel circuit, comprising:

a light emitting module connected in series between a positive power supply signal and a negative power supply signal; and a driving module connected in series with the light emitting module and including at least two driving units connected in parallel, wherein, each of the at least two driving units is connected with a corresponding data signal and controls a light emitting time of the light emitting module based on a time interval between a pulse start time of a first control signal and a pulse start time of a second control signal.

2. The pixel circuit of claim 1, wherein each of the driving units is configured to write the data signal based on the first control signal and determine a start point of the light emitting time based on the pulse start time of the first control signal, or each of the driving units is configured to determine an end point of the light emitting time based on the pulse start time of the second control signal.

3. The pixel circuit of claim 1, wherein the at least two driving units include a first driving unit and a second driving unit, wherein the first driving unit includes a first driving transistor and is configured to write the first data signal based on the first control signal; the second driving unit includes a second driving transistor and is configured to write the second data signal based on the first control signal; and a pulse amplitude of the first data signal is different from a pulse amplitude of the second data signal, and a size of the first driving transistor is different from a size of the second driving transistor.

4. The pixel circuit of claim 3, wherein a range of a ratio of a size of one of the first driving transistor and the second driving transistor to a size of another of the first driving transistor and the second driving transistor is greater than or equal to 1.8 and less than or equal to 2.2.

5. The pixel circuit of claim 3, wherein a range of a ratio of a size of one of the first driving transistor and the second driving transistor to a size of another of the first driving transistor and the second driving transistor is greater than or equal to 2.7 and less than or equal to 3.3.

6. The pixel circuit of claim 3, wherein a range of a ratio of a size of one of the first driving transistor and the second driving transistor to a size of another of the first driving transistor and the second driving transistor is greater than or equal to 3.6 and less than or equal to 4.4.

7. The pixel circuit of claim 1, wherein the at least two driving units include a first driving unit, a second driving unit, and a third driving unit, wherein the first driving unit includes a first driving transistor and is configured to write the first data signal based on the first control signal; the second driving unit includes a second driving transistor and is configured to write the second data signal based on the first control signal; the third driving unit includes a third driving transistor and is configured to write a third data signal based on the first control signal, and wherein a pulse amplitude of the first data signal, a pulse amplitude of the second data signal, and a pulse amplitude of the third data signal are different, and a size of the first driving transistor, a size of the second driving transistor, and a size of the third driving transistor are different.

8. The pixel circuit of claim 7, wherein a range of a ratio of a size of the first driving transistor to a size of the second driving transistor is greater than or equal to 1.8 and less than or equal to 2.2, and a range of a ratio of a size of the second driving transistor to a size of the third driving transistor is greater than or equal to 1.8 and less than or equal to 2.2.

9. The pixel circuit of claim 1, wherein each of the driving units includes:

a driving transistor, wherein one of a source/drain of the driving transistor is electrically connected to one terminal of the light emitting module, and another of the source/drain of the driving transistor is connected with the negative power supply signal; or one of the source/drain of the driving transistor is connected with the positive power supply signal, and another of the source/drain of the driving transistor is electrically connected to the another terminal of the light emitting module;

a charging transistor, wherein one of a source/drain of the charging transistor is electrically connected to a gate of the driving transistor, another of the source/drain of the charging transistor is connected with the corresponding data signal, and a gate of the charging transistor is connected to the first control signal;

a discharging transistor, wherein one of a source/drain of the discharging transistor is electrically connected to the gate of the driving transistor, another of the source/drain of the discharging transistor is connected with an initial signal, and a gate of the discharging transistor is connected with the second control signal; and a storage capacitor, wherein one terminal of the storage capacitor is electrically connected to the gate of the driving transistor, and another terminal of the storage capacitor is electrically connected to another of the source/drain of the driving transistor.

10. The pixel circuit of claim 1, wherein the light emitting module includes at least two light emitting devices connected in series, and the at least two light emitting devices are connected in series between the positive power supply signal and the negative power supply signal.

11. A display panel, comprising a pixel circuit comprising:

a light emitting module connected in series between a positive power supply signal and a negative power supply signal; and a driving module connected in series with the light emitting module and including at least two driving units connected in parallel, wherein, each of the at least two driving units is connected with a corresponding data signal and controls a light emitting time of the light emitting module based on a time interval between a pulse start time of a first control signal and a pulse start time of a second control signal, wherein the display panel is a self light emitting display panel.

12. The display panel of claim 11, wherein each of the driving units is configured to write the data signal based on the first control signal and determine a start point of the light emitting time based on the pulse start time of the first control signal, or each of the driving units is configured to determine an end point of the light emitting time based on the pulse start time of the second control signal.

13. The display panel of claim 11, wherein the at least two driving units include a first driving unit and a second driving unit, wherein the first driving unit includes a first driving transistor and is configured to write the first data signal based on the first control signal; the second driving unit includes a second driving transistor and is configured to write the second data signal based on the first control signal; and a pulse amplitude of the first data signal is different from a pulse amplitude of the second data signal, and a size of the first driving transistor is different from a size of the second driving transistor.

14. The display panel of claim 13, wherein a range of a ratio of a size of one of the first driving transistor and the second driving transistor to a size of another of the first driving transistor and the second driving transistor is greater than or equal to 1.8 and less than or equal to 2.2.

15. The display panel of claim 13, wherein a range of a ratio of a size of one of the first driving transistor and the second driving transistor to a size of another of the first driving transistor and the second driving transistor is greater than or equal to 2.7 and less than or equal to 3.3.

16. The display panel of claim 13, wherein a range of a ratio of a size of one of the first driving transistor and the second driving transistor to a size of another of the first driving transistor and the second driving transistor is greater than or equal to 3.6 and less than or equal to 4.4.

17. The display panel of claim 11, wherein the at least two driving units include a first driving unit, a second driving unit, and a third driving unit, wherein the first driving unit includes a first driving transistor and is configured to write the first data signal based on the first control signal; the second driving unit includes a second driving transistor and is configured to write the second data signal based on the first control signal; the third driving unit includes a third driving transistor and is configured to write a third data signal based on the first control signal, and wherein a pulse amplitude of the first data signal, a pulse amplitude of the second data signal, and a pulse amplitude of the third data signal are different, and a size of the first driving transistor, a size of the second driving transistor, and a size of the third driving transistor are different.

18. The display panel of claim 17, wherein a range of a ratio of a size of the first driving transistor to a size of the second driving transistor is greater than or equal to 1.8 and less than or equal to 2.2, and a range of a ratio of a size of the second driving transistor to a size of the third driving transistor is greater than or equal to 1.8 and less than or equal to 2.2.

19. The display panel of claim 11, wherein each of the driving units includes:

a driving transistor, wherein one of a source/drain of the driving transistor is electrically connected to one terminal of the light emitting module, and another of the source/drain of the driving transistor is connected with the negative power supply signal; or one of the source/drain of the driving transistor is connected with the positive power supply signal, and another of the source/drain of the driving transistor is electrically connected to the another terminal of the light emitting module;

a charging transistor, wherein one of a source/drain of the charging transistor is electrically connected to a gate of the driving transistor, another of the source/drain of the charging transistor is connected with the corresponding data signal, and a gate of the charging transistor is connected to the first control signal;

a discharging transistor, wherein one of a source/drain of the discharging transistor is electrically connected to the gate of the driving transistor, another of the source/drain of the discharging transistor is connected with an initial signal, and a gate of the discharging transistor is connected with the second control signal; and a storage capacitor, wherein one terminal of the storage capacitor is electrically connected to the gate of the driving transistor, and another terminal of the storage capacitor is electrically connected to another of the source/drain of the driving transistor.

20. The display panel of claim 11, wherein the light emitting module includes at least two light emitting devices connected in series, and the at least two light emitting devices are connected in series between the positive power supply signal and the negative power supply signal.

* * * * *